(12) United States Patent
Goto (10) Patent No.: US 6,505,620 B1
(45) Date of Patent: Jan. 14, 2003

(54) GAS COOKING STOVE (75) Inventor: Hajime Goto, Tokyo (JP)

(73) Assignee: Toho Metal Industries Co., Ltd. (JP)

( * ) Notice: Subject to any disclaimer, the term of this patent is extended or adjusted under 35 U.S.C. 154(b) by 0 days.

(21) Appl. No.: 09/431,879

(22) Filed: Nov. 2, 1999

(30) Foreign Application Priority Data

Dec. 25, 1998 (JP) .......................................... 10-369801
Jul. 12, 1999 (JP) .......................................... 11-197813

(51) Int. Cl.$^7$ .............................................. F24C 5/20
(52) U.S. Cl. ............................. 126/38; 126/40; 126/50; 126/305; 431/344
(58) Field of Search .............................. 126/38, 40, 50, 126/39 R, 41 R, 44, 305, 42, 304 R; 431/142, 344, 343

(56) References Cited

U.S. PATENT DOCUMENTS

| | | | | |
|---|---|---|---|---|
| 4,192,284 A | * | 3/1980 | Vache ........................ | 126/38 |
| 4,759,339 A | * | 7/1988 | Hefling ...................... | 431/344 |
| 5,267,852 A | * | 12/1993 | Mizuno ...................... | 431/344 |
| 5,613,485 A | * | 3/1997 | Covault ...................... | 126/38 |

FOREIGN PATENT DOCUMENTS

| | | | | |
|---|---|---|---|---|
| FR | 1113144 | * | 3/1956 | ................ 126/50 |
| JP | 6-159683 | * | 6/1994 | ................ 126/50 |

* cited by examiner

*Primary Examiner*—James C. Yeung
(74) *Attorney, Agent, or Firm*—Ronald P. Kananen; Rader, Fishman & Grauer PLLC (57) ABSTRACT

A gas cooking stove is disclosed to which a very-small gas cylinder is joined in a one-touch manner and the state of joining is reliably maintained. When the gas cooking stove is used, the gas cooking stove can stably be installed. When the gas cooking stove is not used, the overall size can be reduced to save the space. Thus, the operability, safety and the portability can be improved. A valve mechanism, an operation member for opening/closing the valve mechanism and a piezoelectric spark unit are provided. Moreover, a stove body is provided which has an upper portion to which a dish is joined and a lower portion provided with a gas-cylinder joining portion to which a gas cylinder is joined. A grate is rotatively supported by the dish. The gas cylinder having a valve-joining cylindrical portion which is integrally formed with the gas cylinder, which accommodates a valve mechanism, in which the valve mechanism is secured and from which a stem is allowed to project over the valve-joining cylindrical portion is joined to the gas-cylinder joining portion in the one-touch manner. The gas cylinder has the valve-joining cylindrical portion which is held by a cylinder holding member.

1 Claim, 7 Drawing Sheets

GAS COOKING STOVE

BACKGROUND OF THE INVENTION

1. Field of the Invention

The present invention relates to a small gas cooking stove which uses a small gas cylinder, which exhibits satisfactory portability and which is capable of heating an object of heating in a relatively short time.

2. Description of the Related Art

A gas cooking stove can easily be carried to an arbitrary site. Moreover, the gas cooking stove permits relatively strong beating power to be obtained. Therefore, the gas cooking stoves are widely used in outdoors as well as in households and cookshops in which the gas cooking stoves are used commercially. A valve mechanism having a stem is mounted on the body of the gas cylinder. The gas cylinder is filled with a liquefied fuel gas, such as liquefied butane or the like, having a relatively low activity. A portion of the liquefied fuel gas enclosed in the body of the gas cylinder is vaporized, causing the internal pressure of the gas cylinder to be higher than the outside pressure. The gas cylinder is joined to the gas cooking stove so that the stem is pushed inwards and the valve mechanism is opened. Thus, the fuel gas is discharged owing to the internal pressure. Note that the gas cylinder for households has a structure that the diameter of the body of the gas cylinder is about 66 mm and the overall length of the same including the stem is about 185 mm.

The gas cooking stove arranged to be used outdoors must have a simple structure, light weight and satisfactory portability. For example, a small gas cooking stove has been disclosed in Japanese Patent No. 2663340 under the title of "PORTABLE GAS COOKING STOVE" (filed by PEARL METAL Co., Ltd.). The portable gas cooking stove disclosed as described above incorporates a body of the gas cooking stove, a burner, grate and a dish. A gas cylinder directly joined to a joining portion formed in the lower portion of the body of the gas cooking stove serves as a dish for receiving fluid. The portable gas cooking stove disclosed as described above has the grate which is capable of rotating with respect to the body of the gas cooking stove. Thus, the grate is rotated to an arbitrary position when the gas cooking stove is used. The foregoing portable gas cooking stove requires only a small number of elements. Moreover, the size can be reduced when the gas cooking stove is not used by reducing the diameter of the grate. Therefore, the portability can be improved. As a result, the foregoing gas cooking stove is used as significantly advantageous camping equipment.

In general, it is necessary for the gas cooking stove to stably be installed when the gas cooking stove is operated. Moreover, the gas cooking stove must allow an object which must be heated to stably be installed. The foregoing portable gas cooking stove disclosed as described above has the structure that the grate is extended to permit an object, which must be heated, to stably be installed. The portable gas cooking stove disclosed as described above is arranged such that the area for installation is the outer diameter of the gas cylinder. Therefore, there arises a problem in that a large area for installation cannot easily be obtained and, thus, a large object cannot be heated.

Therefore, the portable gas cooking stove is arranged to use a gas cylinder having a large outer diameter with respect to the overall height, that is, a so-called "short cylindrical" shape to obtain the area for installation. The foregoing gas cylinder, however, requires a large space. As a result, the portability deteriorates if the gas cooking stove has a small size and a light weight.

The portable gas cooking stove disclosed above has a structure for directly joining the gas cylinder to the joining portion. The structure, which has not been described in the specification, is arranged such that a thread formed in a cylindrical portion of a mounting cup for joining a valve is used to screw the gas cylinder to the joining portion. Another method has been employed with which an engaging member provided for the joining portion is engaged to a flange portion and the engaging member is rotated. Thus, the gas cylinder is joined to the joining portion. Another method has been employed with which a pipe-shape needle member provided for the joining portion is inserted into a portion of the gas cylinder having a small thickness.

The foregoing screwing method must perform an operation for rotating the gas cylinder in a state in which the joining portion is engaged to the inside portion of the flange portion. Thus, there arises a problem in that a complicated handling operation must be performed. The engaging method using the engaging member encounters a problem in that the structure is too complicated because a plurality of the engaging members and structures for supporting the plural engaging members are provided for the body of the gas cooking stove. Although the needle insertion method is able to improve the operability because the gas cylinder is, by a one-touch manner, joined to the body of the gas cooking stove, there arises a problem in that the needle member will easily be broken. What is worse, an opening formed in the gas cylinder causes a problem to arise in that the gas cylinder cannot again be used.

Another gas cooking stove having a small size has been disclosed. The foregoing gas cooking stove incorporates a grate opening/closing mechanism which incorporates a plurality of support shafts provided for, for example, an outer periphery of the dish so that an end of plate-like grate is rotatively supported by each of the support shaft. Moreover, the foregoing gas cooking stove incorporates a mechanism for opening/closing plate-like support legs each having an end which is rotatively supported by the support shaft. The foregoing gas cooking stove is structured such that each grate member and support leg is rotated in a direction of the tangential line so as to be stopped by a stopper when the gas cooking stove is used. The foregoing gas cooking stove has a characteristic that the multiplicity of the grate members and support legs are folded along the outer surface of the dish and that of the body of the gas cooking stove so that the size reduction is permitted.

However, the multiplicity of the grates and the support legs of the foregoing gas cooking stove must be folded in orderly sequence. That is, a complicated operation must be performed. Another problem arises in that the multiple grates and support legs project outwards even in an accommodated state, thus causing a space efficiency deteriorates. Since the above-mentioned gas cooking stove has the support shafts and stoppers, there arises a problem in that many elements are required and thus the structure cannot be simplified.

A tabletop gas cooking stove having a relatively large size for use in housholds or the like usually has a governor mechanism for controlling the flow rate of a gas. If the internal pressure of the gas cylinder is rapidly raised owing to abnormal heat or the like of the gas cylinder, the governor mechanism also has a safety function to prevent occurrence of a serious accident, such as explosion of the gas cylinder such that the governor mechanism closes the passage for the gas to automatically extinguish the burner. As described above, the tabletop gas cooking stove has been structured such that the governor mechanism is operated to interrupt supply of the gas if the pressure of the gas is raised to a level not lower than a predetermined pressure during a usual state of use. The gas cylinder must conform to a safety standard that the body of the gas cylinder is not deformed when the internal pressure is 13 kg·fcm$^2$ or lower.

The foregoing governor mechanism causes the size of the gas cooking stove to be enlarged and makes the structure of the same to be complicated. Moreover, the governor mechanism raises the cost of the gas cooking stove. Therefore, the governor mechanism is not usually provided for the foregoing portable gas cooking stove disclosed as described above and having the structure that the gas cylinder is directly connected to the gas cooking stove. The reason for this lies in that the abnormal heat or the like does not easily occur because the foregoing gas cooking stove is usually used outdoors and therefore relatively sufficient heat radiation can be realized.

Since relatively large heating power can be obtained from the gas cooking stove, the gas cooking stove is sometimes substituted for a cooking range using solid fuel and serving as an apparatus for heating a cooking pan or meat. Since a gas cooking stove for households is employed as the foregoing gas cooking stove, there arises a problem in that the size of the gas cooking stove for households is too large to be placed on a table while permitting other dishes to be placed on the same table.

The applicant of the present invention has provided a new and very-small gas cylinder having an outer diameter of about 35 mm, a height to the leading end of the stem is about 53 mm and weight of about 26 g and filled with about 12 g of liquefied fuel gas. The new gas cylinder filled with the liquefied fuel gas in a quantity which is sufficiently large to perform cooking for one person enables a gas cooking stove to be realized which has a small size and satisfactory portability and which is capable of efficiently using a limited space on the table.

SUMMARY OF THE INVENTION

Accordingly, an object of the present invention is to provide a small-size gas cooking stove which is adaptable to the foregoing very-small gas cylinder arranged to be, in a one-touch manner, joined/removed to a portion of the gas cooking stove for joining the gas cylinder, capable of reliably maintaining the state of joining, which can stably be installed when a cooking operation is performed and reducing the size when the apparatus is not used to efficiently use a space, which can easily be operated and which exhibits satisfactory safety and portability.

To achieve the foregoing object, according to one aspect of the present invention, there is provided a gas cooking stove arranged to use a gas cylinder having a valve-joining cylindrical portion which is molded integrally with the upper portion of the body of the gas cylinder to project over the upper portion of the body, which fixedly accommodates a valve mechanism and which has a projecting stem. The gas cooking stove according to the present invention comprises: a dish provided with a burner and a grate so that a combustion portion is constituted. The gas cooking stove incorporates a body, which is provided with a valve mechanism for supplying fuel gas to the burner and an operating member for opening/closing the valve mechanism, and which has an upper portion to which the dish is joined and a lower portion provided with a gas-cylinder joining portion to which the gas cylinder is joined.

The gas-cylinder joining portion has an engaging recess having a gas passage allowed to communicate with a valve hole which supplies fuel gas to the valve mechanism through the burner and a cylinder holding mechanism for holding the valve-joining cylindrical portion of the engaged gas cylinder.

The gas-cylinder joining portion incorporates a cylinder-holding-member joining portion having an annular shape and formed in the inner surface of the opening formed in the engaging recess of the gas-cylinder joining portion and a cylinder holding member which is formed into a U-like shape and which is made of an elastic member and joined in the cylinder holding member joining portion such that at least a portion of the elastic member projects into the opening.

The gas cylinder is directly joined to the gas cooking stove such that the valve-joining cylindrical portion is inwards pushed into the engaging recess of the gas-cylinder joining portion. The valve-joining cylindrical portion of the gas cooking stove engaged to the engaging recess is held by the cylinder holding mechanism. Fuel gas is supplied into the gas passage of the gas cooking stove through the opening when the stem is inwards pushed in the foregoing state. The operating member is operated to open the valve mechanism, followed by operating the spark plug in a state in which fuel gas has been supplied to the burner. Thus, the fuel gas is burnt.

When the valve-joining cylindrical portion of the gas cylinder is inwards pushed and engaged to the engaging recess of the gas cooking stove through the opening, the valve-joining cylindrical portion is introduced into the engaging recess while the valve-joining cylindrical portion is enlarging the diameter of the cylinder holding member. When the valve-joining cylindrical portion of the gas cylinder is engaged to a position at which a crimping recess formed in the outer surface of the valve-joining cylindrical portion corresponds to the cylinder holding member, the cylinder holding member is engaged to the crimping recess in a state in which the cylinder holding member has elastically been deformed. Thus, the gas cylinder is joined and held by the gas-cylinder joining portion. The gas cylinder can be joined to the gas cooking stove by a one-touch operation that the valve-joining cylindrical portion is inwards pushed and engaged to the engaging recess. When the valve-joining cylindrical portion is drawn from the engaging recess of the gas cooking stove, the diameter of the cylinder holding member is enlarged. Thus, the gas cylinder can be removed by the one-touch operation.

Other objects, features and advantages of the invention will be evident from the following detailed description of the preferred embodiments described in conjunction with the attached drawings.

DESCRIPTION OF THE PREFERRED EMBODIMENT

An embodiment of the present invention will now be described with reference to the drawings. A gas cooking stove 10 according to this embodiment is adapted to a very-small gas cylinder 1 shown in FIG. 1. The gas cylinder 1 incorporates a body 2 and a bottom plate 3. The gas cylinder 1 has a structure that a valve mechanism 6 having a stem 5 and so forth are joined to the inside portion of a valve-joining cylindrical portion 4 formed in the upper end portion of the body 2 of the cylinder 1. Liquefied gas, for example, liquefied butane, having relatively low activity and in a pressurized state, is enclosed in the internal space of the body 2 of the cylinder 1.

Figure 1:
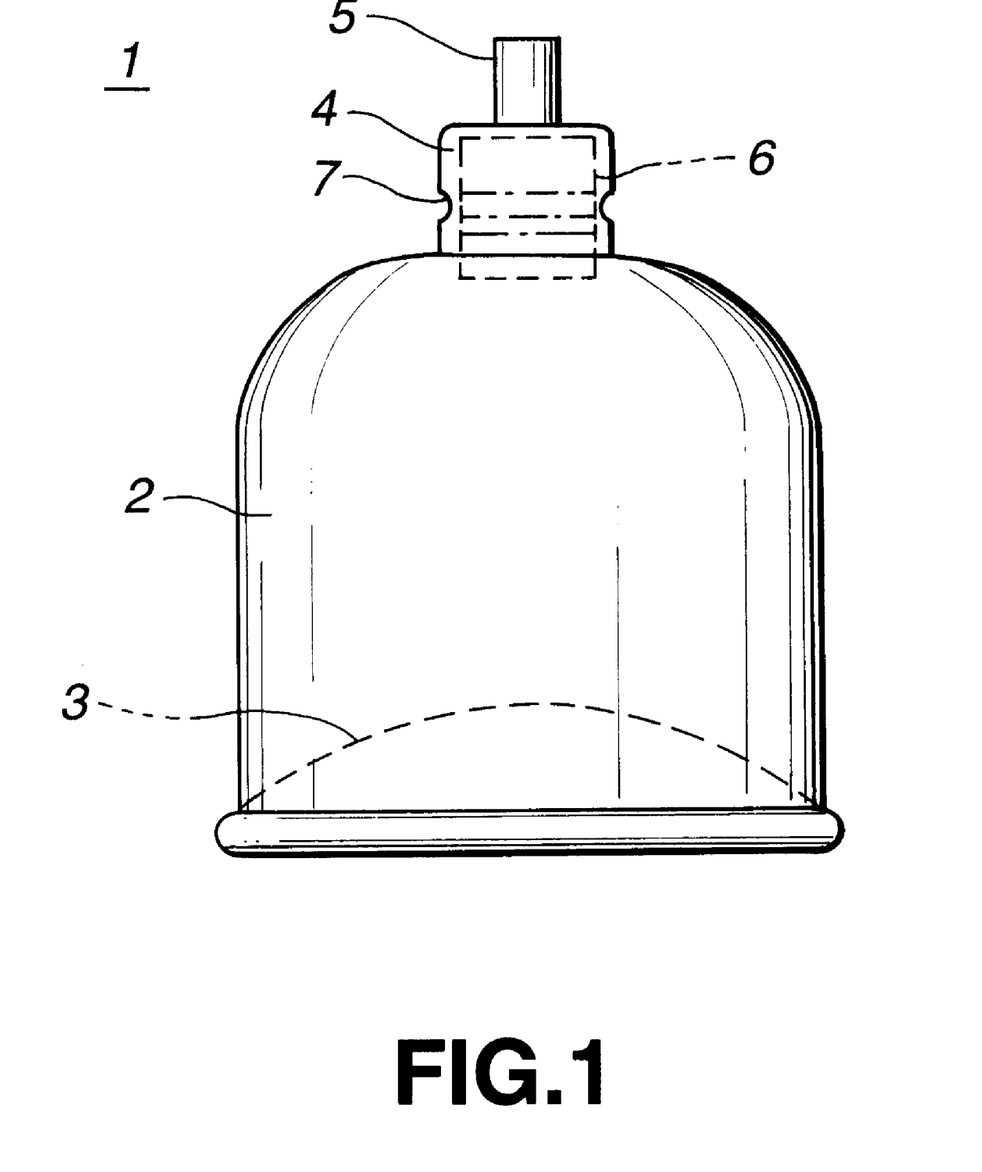
FIG. 1 is a front view showing a very-small gas cylinder for use in a small-size gas cooking stove according to the present invention.

The body 2 of the cylinder 1 is formed into an inverted and seamless U-shape manufactured by, for example, deep-drawing a thin metal plate made of stainless steel or aluminum. The body 2 of the cylinder 1 has a cylindrical valve-joining cylindrical portion 4 which has a stem hole opened in the top portion thereof and which is integrally formed with the body 2 such that the body 2 expands over the body 2 of the cylinder 1. A bottom plate 3 is joined to the opened bottom of the body 2 of the cylinder 1 so that the overall shape of the body 2 of the cylinder 1 is formed into a sealed container. The bottom plate 3 has circular-arc cross sectional shape which is inwards warped with a moderate curvature to attain mechanical strength against the internal pressure of the internal space. Moreover, vaporization of the enclosed liquefied fuel gas can be enhanced.

The valve mechanism 6 has a cylindrical body in which a gas passage is formed, the body including a variety of members, such as a packing, stem rubber, a coil spring and spring retainers. The valve mechanism 6 causes the leading end of the stem 5 to project through a stem hole, the valve mechanism 6 having the coil spring which realizes the projection of the stem 5. In a natural state in which the stem 5 projects maximally, the gas passage is closed. In a state in which the stem 5 has been pushed inwards, the gas passage is opened so that the fuel gas is injected.

The valve mechanism 6 is subjected to a crimping work so that the outer diameter of the valve mechanism 6 is reduced. Thus, the body of the valve mechanism 6 is crimped so as to be fixed to the inside portion of the valve-joining cylindrical portion 4. As shown in FIG. 1, the gas cylinder 1 has a crimping recess 7 having a semi-circular-arc cross sectional shape and formed around the overall outer surface of the valve-joining cylindrical portion 4.

A portion of the liquefied fuel gas is vaporized in the internal space in the body 2 of the cylinder 1 so that the internal pressure of the body 2 of the cylinder 1 is higher than the external pressure. The stem 5 of the gas cylinder 1 is inwards pushed in a state in which the gas cylinder 1 is directly joined to the gas-cylinder joining portion 13 of the gas cooking stove 10 as described later. Thus, the valve mechanism 6 of the gas cylinder 1 is opened so that the vaporized fuel gas is injected from the internal space into the stove body 11.

The conventional and usual gas cylinder is structured such that a mountain cup is manufactured by joining a ready-made valve mechanism. Then, the mountain cup is joined to the body of the cylinder. As described above, the valve-joining cylindrical portion 4 for accommodating and securing the valve mechanism 6 is integrally molded with the body 2 of the cylinder 1. Therefore, the manufacturing cost can considerably be reduced as compared with the conventional and usual gas cylinder because the number of elements and that of the manufacturing steps can be reduced. Thus, the gas cylinder 1 has the reduced size which cannot be realized by the conventional and usual gas cylinder.

Figure 2:
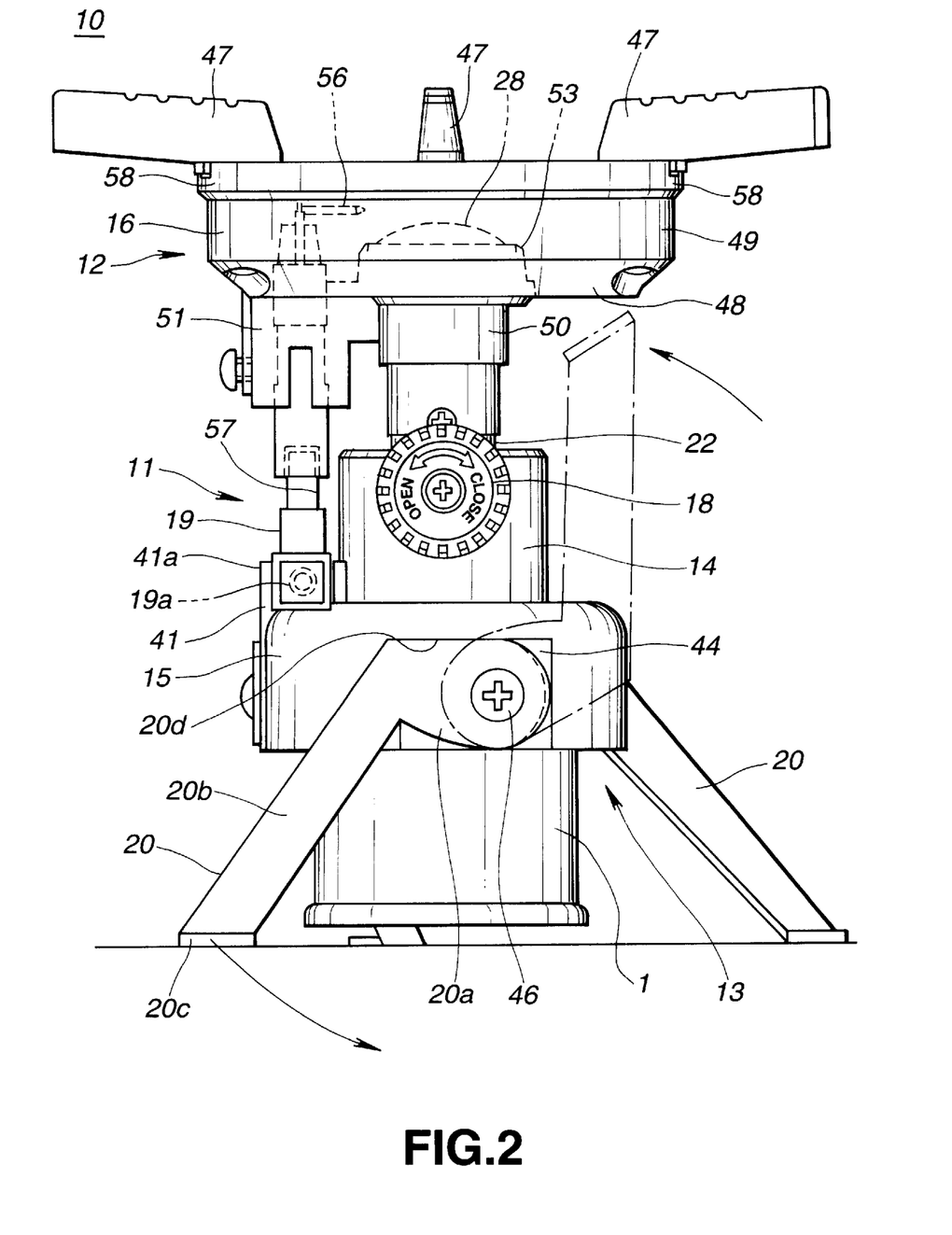
FIG. 2 is a front view showing a state in which the gas cooking stove is being used.
Figure 3:
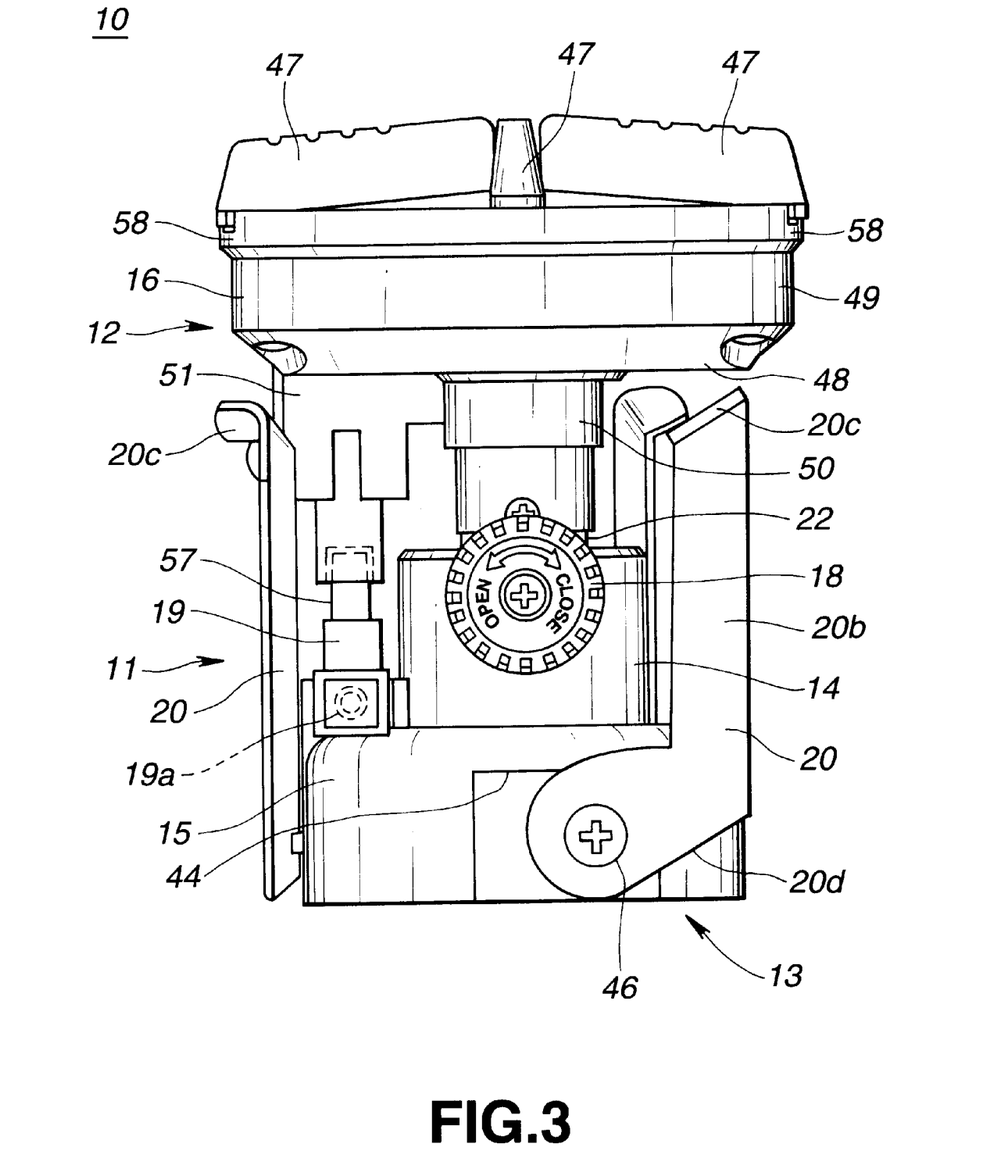
FIG. 3 is a front view showing a state in which the gas cooking stove is not being used.

As shown in FIGS. 2 and 3, a combustion portion 12 is disposed in the upper portion of the stove body 11 of the gas cooking stove 10. The gas cooking stove 10 has the gas-cylinder joining portion 13 formed in the lower portion of the stove body 11. When the gas cooking stove is operated, the gas cylinder 1 is joined to the gas-cylinder joining portion 13 in the one-touch manner. In a state of use of the gas cooking stove 10 shown in FIG. 2, the gas cooking stove 10 has a height of about 115 mm and a width and a depth of about 118 mm. The gas cooking stove 10 has a height of about 89 mm, a width of about 75 mm and a depth of about 90 mm in a non-use state shown in FIG. 3.

Figure 4:
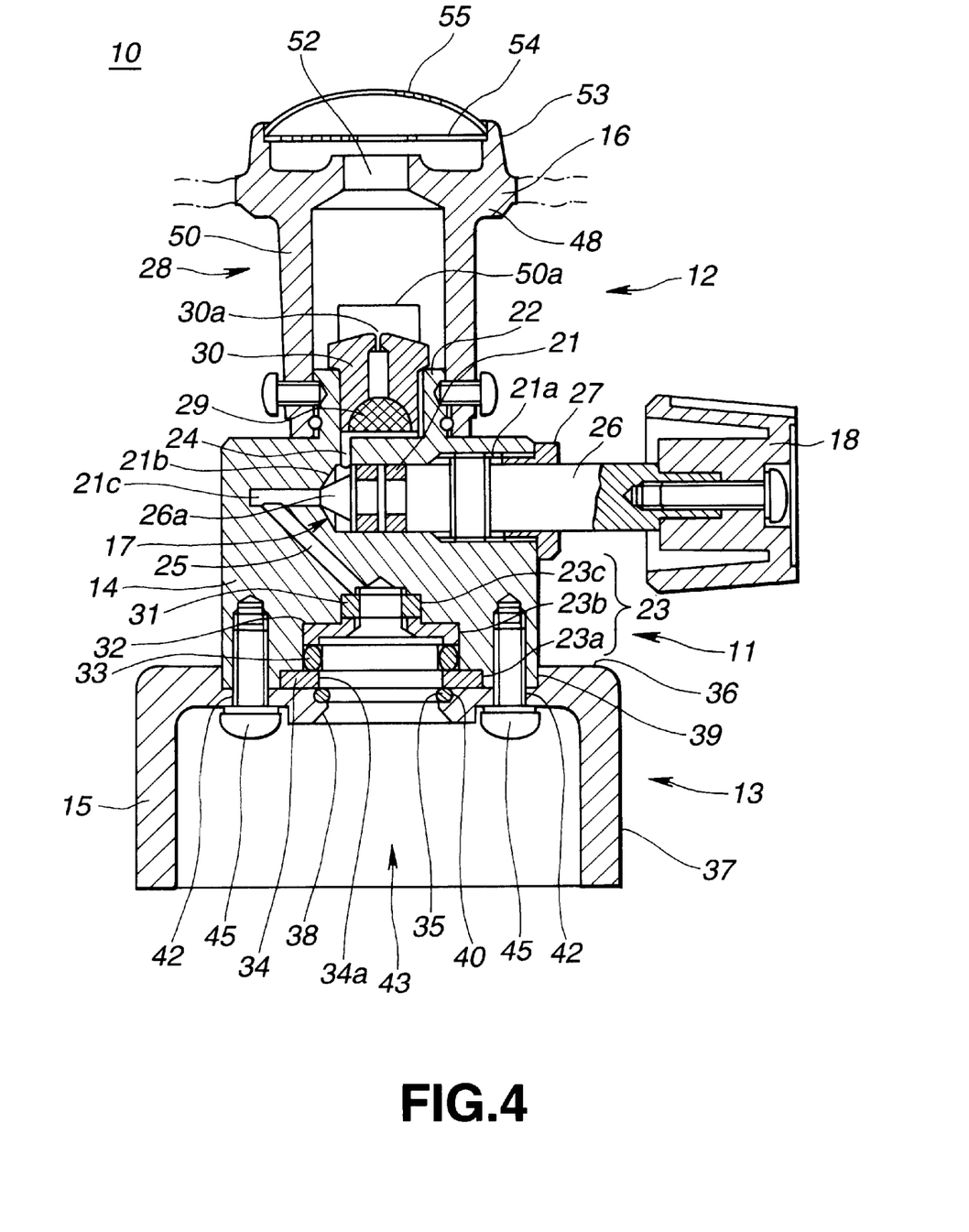
FIG. 4 is a vertical cross sectional view showing an essential portion of the structure of the body of the gas cooking stove.

As shown in FIGS. 2 to 4, the stove body 11 incorporates a plug 14 and a cylinder holding member 15 joined to the bottom of the plug 14. The stove body 11 has a structure that a dish 16 constituting the combustion portion 12 is joined to the position above the plug 14. A valve mechanism 17 to be described later is disposed in the plug 14. Moreover, an operation dial 18 for opening/closing the valve mechanism 17 and a piezoelectric spark unit 19 are provided for the plug 14. As described later, the cylinder holding member 15 constitutes the gas-cylinder joining portion 13 and supports three installing legs 20 to be described later on the outer surface thereof.

Figure 5:
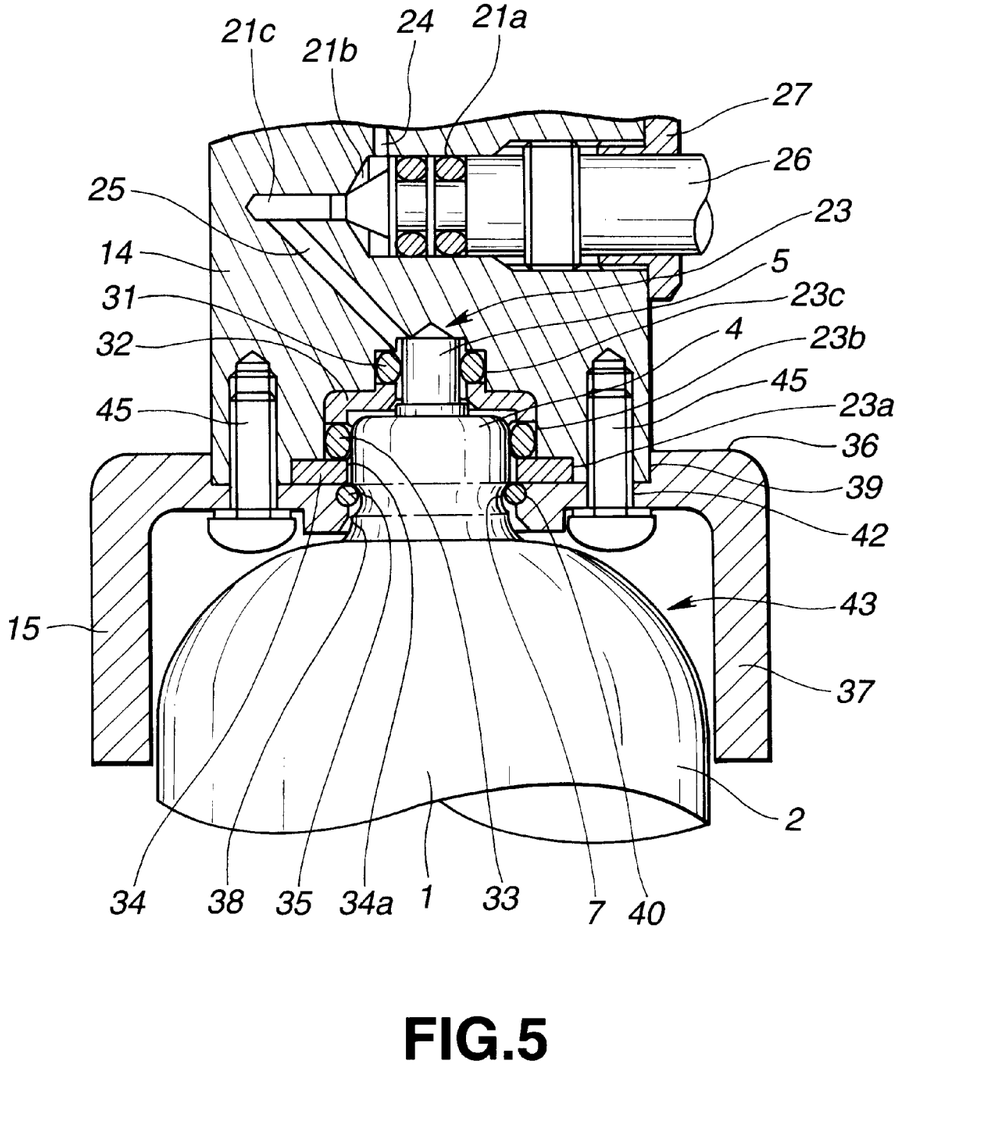
FIG. 5 is a vertical cross sectional view showing an essential portion of a state in which the gas cylinder has been joined to a gas-cylinder joining portion provided for the body of the gas cooking stove.

As shown in FIGS. 4 and 5, the plug 14 is provided with a horizontal valve opening 21 formed therein and having an end which is opened in the side surface of the plug 14. Moreover, a burner-joining cylindrical portion 22 is integrally formed with the upper surface of the plug 14. The plug 14 has a stem engaging recess 23 which is opened in the bottom of the plug 14 and to which the stem 5 of the gas cylinder 1 is engaged. The burner-joining cylindrical portion 22 and the stem engaging recess 23 are formed in the central portion of the plug 14 such that their axes are aligned to each other. The plug 14 has a first gas passage 24 opened in the bottom of the burner-joining cylindrical portion 22 and formed continuously from the valve opening 21. The plug 14 has a second gas passage 25 formed from the valve opening 21 and continued to the stem engaging recess 23.

The plug 14 has a structure that a spindle shaft 26 constituting the valve mechanism 17 is received in a valve opening 21 in a state that separation is prevented by a stopper nut 27 screwed in an opening. The valve opening 21 is a stepped opening having a structure that a small-diameter portion 21c is formed continuously to the leading end of a large-diameter portion 21a through a V-shape nozzle opening 21b. The valve opening 21 has a structure that a first gas passage 24 is formed continuously to the large-diameter portion 21a. Moreover, a second gas passage 25 is formed continuously to the small-diameter portion 21c. The large-diameter portion 21a has an internal thread with which the spindle shaft 26 can be screwed in/out in the axial direction. The valve opening 21 has a structure that the spindle shaft 26 is moved in the axial direction through the operation dial 18 as described later. Thus, the communication between the first gas passage 24 and the second gas passage 25 is controlled.

The spindle shaft 26 has an outer thread which is engaged to the inner thread of the valve opening 21. Moreover, a conical valve 26a, which is engaged to the small-diameter portion 21c of the valve opening 21 to open/close the second gas passage 25, is formed integrally with the leading end of the spindle shaft 26. An "O" ring for sealing the large-diameter portion 21a of the valve opening 21 is fitted to the spindle shaft 26. The spindle shaft 26 has a thread hole formed in another end portion thereof exposed over the plug 14. Thus, the operation dial 18 is joined to the spindle shaft 26 with a fixing screw which is screwed in the foregoing thread hole.

When the operation dial 18 is rotated counterclockwise in FIG. 2, the spindle shaft 26 is moved in the axial direction to the right-hand portion in FIG. 4 while the spindle shaft 26 is being rotated integrally with the operation dial 18. Thus, the valve 26a of the spindle shaft 26 is moved rearwards and apart from the small-diameter portion 21c of the valve opening 21. Thus, the gas passage constituted by the second gas passage 25, the valve opening 21 and the first gas passage 24 is opened.

When the operation dial 18 is rotated clockwise in FIG. 2, the spindle shaft 26 is moved in the axial direction to the left-hand portion in FIG. 4 while the spindle shaft 26 is being rotated integrally with the operation dial 18. Thus, the valve 26a is engaged to the small-diameter portion 21c of the valve opening 21. Thus, the gas passage constituted by the second gas passage 25, the valve opening 21 and the first gas passage 24 is closed.

A mesh filter 29 and a nozzle 30 which constitute the burner mechanism 28 are joined to the inside portion of the burner-joining cylindrical portion 22. Moreover, the dish 16 is joined to the outer surface of the burner-joining cylindrical portion 22. The mesh filter 29 removes impurities contained in the fuel gas supplied from the first gas passage 24. The nozzle 30 is formed into a cylindrical shape which has an outer diameter which substantially the same as the inner diameter of the burner-joining cylindrical portion 22 and a gas passage formed in the vertical direction. The nozzle 30 has a structure that the diameter of the opening of the gas passage is reduced to form a nozzle hole 30a so that the fuel gas is injected and supplied to the combustion portion 12.

The plug 14 has the above-mentioned stem engaging recess 23 opened in the bottom of the plug 14. As shown in FIGS. 4 and 5, the stem engaging recess 23 is formed into a stepped recess having a large-diameter portion 23a adjacent to the opening, an intermediate-diameter portion 23b continued from the large-diameter portion 23a and a small-diameter portion 23c continued from the stem engaging recess 23 and allowed to communicate with the second gas passage 25.

A first "O" ring 31 is joined in the small-diameter portion 23c of the stem engaging recess 23. Moreover, a second "O" ring 33 is, through a cylindrical collar 32 having a bottom, joined to the intermediate-diameter portion 23b. A pressing plate 34 for pressing the second "O" ring 33 to the large-diameter portion 23a and holding a cylinder holding member 35 to be described later is joined to the stem engaging recess 23. The pressing plate 34 is an annular member having a guide opening 34a. The inner diameter of the guide opening 34a is somewhat smaller than the outer diameter of the valve-joining cylindrical portion 4 of the gas cylinder 1.

The inner diameter of the first "O" ring 31 is substantially the same as the outer diameter of the stem 5 of the gas cylinder 1. The inner diameter of each of the second "O" ring 33 and the collar 32 is substantially the same as the outer diameter of the valve-joining cylindrical portion 4 of the gas cylinder 1. The valve-joining cylindrical portion 4 of the gas cylinder 1 is engaged to the stem engaging recess 23 as described later. The first "O" ring 31 seals the outer surface of the stem 5, while the second "O" ring 33 seals the outer surface of the valve-joining cylindrical portion 4.

Figure 6:
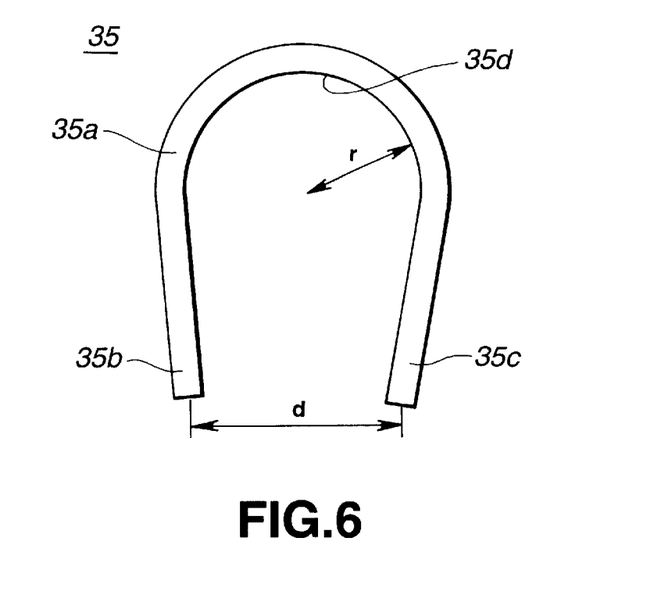
FIG. 6 is a plan view showing a cylinder holding member which constitutes a gas-cylinder holding mechanism provided for the body of the gas cooking stove.

The cylinder holding member 35 is engaged to the crimping recess 7 of the valve-joining cylindrical portion 4 in a state in which the valve-joining cylindrical portion 4 of the gas cylinder 1 is inwards pushed and engaged to the stem engaging recess 23. The cylinder holding member 35 is made of an elastic wire member and formed into a U-shape constituted by a semicircular portion 35a and legs 35b and 35c each of which is extended from the semicircular portion 35a, as shown in FIG. 6.

The cylinder holding member 35 has a structure that the distance d between the legs 35b and 35c is shorter than the radius r of the semicircular portion 35a. The cylinder holding member 35 has a structure that the radius r of the semicircular portion 35a is somewhat smaller than the outer diameter of the valve-joining cylindrical portion 4 of the gas cylinder 1. Moreover, the radius r is somewhat larger than the outer diameter of the crimping recess 7 formed in the valve-joining cylindrical portion 4. The cylinder holding member 35 has a structure that the distance d between the legs 35b and 35c is somewhat shorter than the outer diameter of the crimping recess 7 of the valve-joining cylindrical portion 4.

The cylinder holding member 35 has a converging characteristic and a characteristic for enlarging the diameter because of the characteristics of the material thereof. Therefore, the cylinder holding member 35 has elastic force when it is converged or the diameter is enlarged. The cylinder holding member 35 has the above-mentioned structure so that the valve-joining cylindrical portion 4 of the gas cylinder 1 is able to pass through the semicircular portion 35a. When passing is performed, the legs 35b and 35c are enlarged by the valve-joining cylindrical portion 4. As a result, the diameter of the semicircular portion 35a of the cylinder holding member 35 is reduced. Therefore, the cylinder holding member 35 is engaged to the crimping recess 7 of the valve-joining cylindrical portion 4 as shown in FIG. 5 in a state that the cylinder holding member 35 has the elastic force. The cylinder holding member 35 holds the valve-joining cylindrical portion 4 owing to the foregoing elastic force so that the cylinder holding member 35 holds the gas cylinder 1. As described above, the cylinder holding member 35 enables the gas cylinder 1 to be joined to the gas-cylinder joining portion 13 owing to the one-touch operation for engaging the valve-joining cylindrical portion 4 to the stem engaging recess 23.

The gas cylinder 1 is structured such that the stem 5 is depressed in a state in which the gas cylinder 1 has been engaged to the stem engaging recess 23 so that the fuel gas is introduced into the second gas passage 25. Leakage of the fuel gas from the stem engaging recess 23 is prevented by the first "O" ring 31 and the second "O" ring 33. The fuel gas is introduced from the second gas passage 25 to the small-diameter portion 21c of the valve opening 21. In a state in which the valve mechanism 17 is not opened by the operation of the operation dial 18, the fuel gas is not introduced into the burner mechanism 28.

Figure 7:
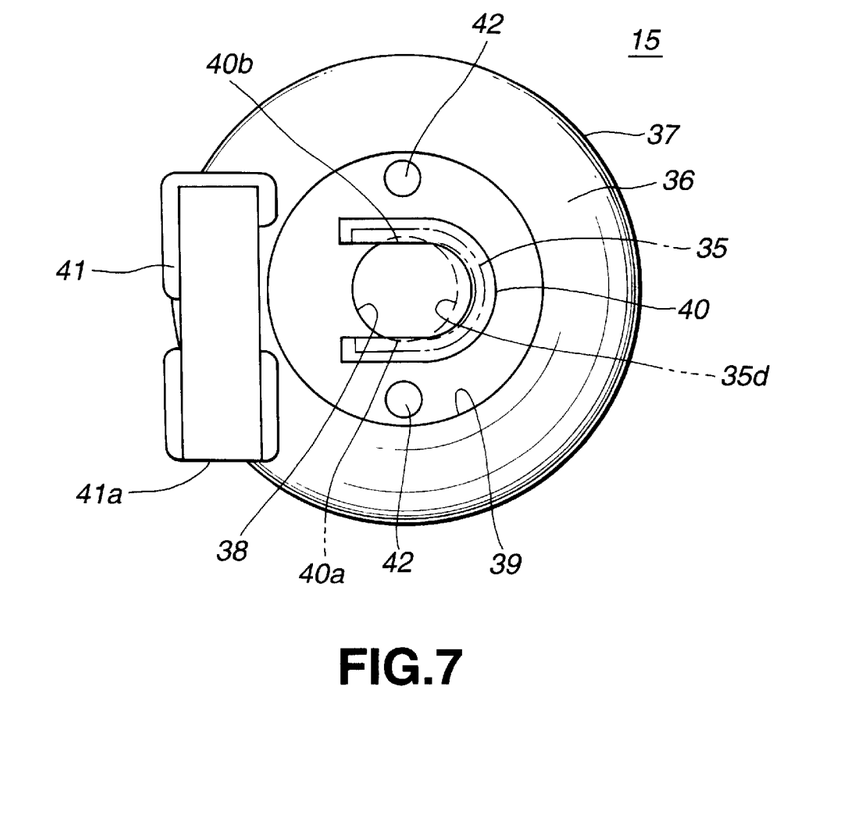
FIG. 7 is a plan view showing a gas-cylinder holding member which constitutes the gas-cylinder joining portion provided for the body of the gas cooking stove.
Figure 8:
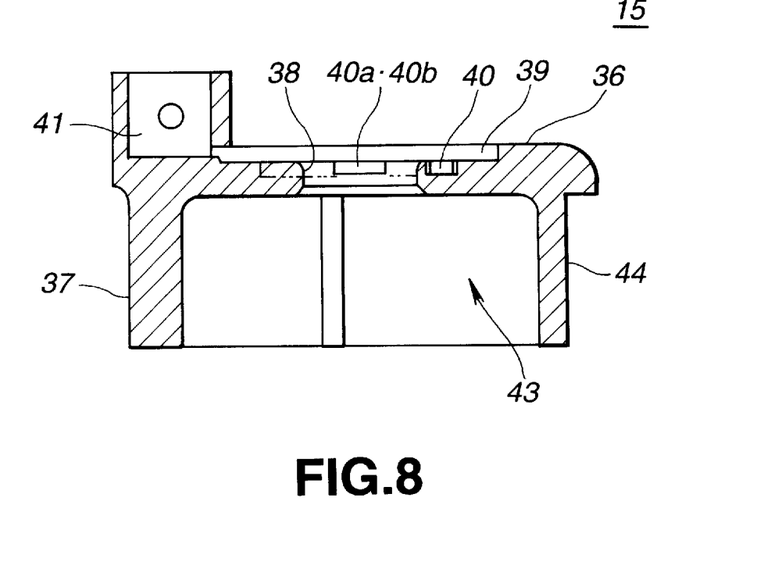
FIG. 8 is a vertical cross sectional view showing the gas-cylinder holding member.

The gas cooking stove 10 has a structure that the gas cylinder 1 constituting the gas-cylinder joining portion 13 is joined to the bottom of the plug 14. As shown in FIGS. 7 and 8, the cylinder holding member 15 is formed into a cup-like shape having an upper surface 36 and a cylindrical outer surface 37 integrally formed with the bottom portion of the upper surface 36. As shown in FIG. 4, the diameter of the outer surface 37 of the cylinder holding member 15 is somewhat larger than the outer diameter of the plug 14.

As shown in FIGS. 7 and 8, the cylinder holding member 15 has a structure that a guide hole 38 is formed in the central portion of the upper surface 36. The inner diameter of the guide hole 38 is somewhat larger than the outer diameter of the valve-joining cylindrical portion 4 of the small-size gas cylinder 1. The cylinder holding member 15 has a joining recess 39 formed around the guide hole 38, the joining recess 39 being a recess to which the bottom of the plug 14 is engaged. The inner diameter of the joining recess 39 is substantially the same as the outer diameter of the bottom of the plug 14. The plug 14 and the cylinder holding member 15 are aligned and joined to each other.

The cylinder holding member 15 has a cylinder-holding-member recess 40 formed around the end of the opening of the guide hole 38, the cylinder-holding-member recess 40 being a recess to which a cylinder holding member 35 to be described later is joined. A piezoelectric-sparking-unit joining portion 41 to which a piezoelectric spark unit 19 is joined is formed integrally with the cylinder holding member 15 at a position on the side of the upper surface 36. The piezoelectric-sparking-unit joining portion 41 is formed into a rectangular shape. A front surface portion 41a of the piezoelectric-sparking-unit joining portion 41 is cut, the front surface portion 41a being a portion in which the operation dial 18 is disposed in a state in which the cylinder holding member 15 has been joined to the plug 14. The cylinder holding member 15 has a structure that the upper surface 36 has a pair of joining holes 42 for joining the cylinder holding member 15 and the plug 14 to each other. The pair of the joining holes 42 are formed opposite to each other such that the guide hole 38 is interposed. The cylinder holding member 15 includes a cylinder joining space 43 into which the gas cylinder 1 is loaded.

The cylinder-holding-member recess 40 has a U-shape having a size which is sufficiently large to accommodate the cylinder holding member 35. As shown in FIGS. 7 and 8, opposite inner portions 40a and 40b are opened in the guide hole 38. The width of the cylinder-holding-member recess 40 is somewhat larger than the diameter of the cylinder holding member 35. The cylinder holding member 35 is joined to the cylinder-holding-member recess 40 in a state in which the distance between legs 35b and 35c has somewhat been elongated. As indicated with a dashed line shown in FIG. 7, the cylinder holding member 35 is joined to the cylinder-holding-member recess 40 such that a portion of an inner portion 35d projects over the inner portions 40a and 40b into the guide hole 38. When the plug 14 is joined to the cylinder holding member 15, the cylinder holding member 35 is maintained in a state in which the cylinder holding member 35 is joined to the inside portion of the cylinder-holding-member recess 40 by a pressing plate 34 joined to the stem engaging recess 23 of the plug 14.

The cylinder holding member 15 has a structure that three installing-leg joining portions 44 disposed at the same intervals in the circumferential direction of the outer surface 37 and arranged to support the installing legs 20 are provided for the outer surface 37. As shown in FIGS. 2 and 3, each of the installing-leg joining portions 44 is formed into a rectangular recess opened in the lower portion of the outer surface 37. Each of the installing-leg joining portions 44 has a thread hole (not shown).

The cylinder holding member 15 structured as described above is joined integrally with the plug 14 by engaging the joining recess 39 to the bottom of the plug 14 and by screwing the fixing bolts 45 into the joining holes 42. The piezoelectric spark unit 19 is joined to the piezoelectric-sparking-unit joining portion 41 of the cylinder holding member 15. As shown in FIGS. 2 and 3, the piezoelectric spark unit 19 is joined to the piezoelectric-sparking-unit joining portion 41 such that an operating portion 19a of the piezoelectric spark unit 19 faces the cut front surface portion 41a. Note that the piezoelectric spark unit 19 has a case which accommodates a slidable operating member (not shown). The operating member operates a piezoelectric device so that a spark plug 56 to be described above sparks.

Although the gas cooking stove 10 is structured such that the operating members are independently depressed to operate the piezoelectric spark unit 19, the operating members may be operated by operating, for example, the operation dial 18. In the foregoing case, the gas cooking stove 10 is structured such that an operating cam is provided for the operation dial 18. Thus, the operation dial 18 is rotated to open the valve mechanism 17. Simultaneously with this, the operation cam presses the operating member so that the piezoelectric spark unit 19 is operated. The gas cooking stove 10 may be structured such that the piezoelectric spark unit 19 and the spark plug 56 are omitted. As an alternative to this, sparking is performed by an arbitrary ignition device.

The gas cooking stove 10 is provided with three installing legs 20 for permitting the gas cooking stove 10 to stably be installed when the gas cooking stove 10 is operated. An end of each of the installing legs 20 is, by a fixing screw 46, rotatively supported by an installing-leg joining portion 44 provided for the outer surface 37 of the cylinder holding member 15. As shown in FIGS. 2 and 3, each of the installing legs 20 is formed into a wedge shape facing upwards such that a leg 20b is bent at a support point 20a and extended from the same. A grounding portion 20c is, by a bending work, formed integrally with the leading end of each of the installing legs 20. In a state in which each of the installing legs 20 has been extended as shown in FIG. 2, the side end of the support point 20a serves as a stopper portion 20d which is made contact with the upper end of the installing-leg joining portions 44.

Each of the installing legs 20 may have a structure that, for example, a torsion spring is disposed between the support point 20a and a fixing screw 46. Thus, the elastic force of the torsion spring urges each installing leg 20 toward an accommodation portion to be described later, that is, in the counterclockwise direction in FIG. 2. Each of the installing legs 20 may have a loosening prevention structure by, for example, joining a washer and a wave washer or the like to the fixing screw 46.

When the gas cooking stove 10 is used, each of the installing legs 20 is rotated with respect to the cylinder holding member 15 so as to be extended as indicated with a solid line shown in FIG. 2. In the foregoing state, each of the installing legs 20 is held such that the stopper portion 20d is made contact with the upper end of the installing-leg joining portions 44. As shown in FIG. 2, each of the installing legs 20 has a length with which the gas cylinder 1 joined to the plug 14 can be held such that the gas cylinder 1 is allowed to somewhat float from the surface of the ground.

Therefore, the gas cooking stove 10 is able to maintain stability if a relative large and heavy object which must be heated is placed on the combustion portion 12 because a sufficiently large space for installation can be maintained by extending each of the installing legs 20. The gas cooking stove 10 is arranged to hold the gas cylinder 1 such that the gas cylinder 1 is allowed to float from the surface of the ground by the installing legs 20. Therefore, unnecessary force is not exerted on the gas-cylinder joining portion 13 to which the gas cylinder 1 has been joined so that leakage of gas or the like is prevented.

When the gas cooking stove 10 is not operated, each of the installing legs 20 is, as indicated with an arrow shown in FIG. 2, counterclockwise rotated in a state indicated with the solid line shown in FIG. 2. Thus, the installing legs 20 are accommodated along the plug 14, as indicated with a dashed line shown in FIG. 2 and as shown in FIG. 3. Therefore, the size of the gas cooking stove 10 can be reduced by accommodating the installing legs 20 along the plug 14. Thus, the portability of the gas cooking stove 10 can be improved.

Although the gas cooking stove 10 has the structure that the installing legs 20 are supported rotatively with respect to the cylinder holding member 15, the present invention is not limited to the foregoing structure. Another structure may be employed in which an end of each of the installing legs 20 is supported by, for example, the cylinder holding member 15 and the installing legs 20 are made to be folding legs through hinges or the like. As an alternative to this, a telescopic structure may be employed. Four or more installing legs 20 may be disposed at the same intervals.

The gas cooking stove 10 may be used such that the installing legs 20 are removed from the cylinder holding member 15. In the foregoing case, it is preferable that the gas cooking stove 10 can be stabilized when the gas cooking stove 10 is accommodated in, for example, a grate container and no load is exerted on the gas cylinder 1.

The combustion portion 12 incorporates the burner mechanism 28 and three members of the grate 47 rotatively joined to the dish 16. The combustion portion 12 is structured such that the grate 47 is expanded with respect to the dish 16 when the gas cooking stove is used. Thus, if a large and heavy object, such as a pan, which must be heated is placed, the object can stably be placed.

The dish 16 is a member serving as the portion on which an object which must be heated is placed, a so-called dish and a windshield. The dish 16 is constituted by a bottom 48, an outer wall 49, a cylindrical outer surface 49 having an inner diameter which is substantially the same as the outer diameter of the burner-joining cylindrical portion 22 of the plug 14 and a joining cylinder 50 formed integrally with the central portion of the bottom 48 to project over the surface of the central portion. A piezoelectric-spark-unit joining portion 51 is integrally provided for the dish 16 at a position on the side of the bottom 48. The dish 16 is joined to the upper portion of the plug 14 as described above by engaging the joining cylinder 50 to the burner-joining cylindrical portion 22 of the plug 14 and by securing the same with a screw.

As shown in FIG. 4, the nozzle 30 faces the inside portion of the joining cylinder 50 in a state in which the dish 16 has been joined to the plug 14. The joining cylinder 50 has a plurality of air inlet openings 50a so that air introduced through the air inlet openings 50a and the fuel gas injected and supplied from the nozzle 30 are mixed with each other so as to be supplied to the burner mechanism 28.

As shown in FIG. 4, the dish 16 has a gas hole 52 formed in the central portion of the inner surface of the bottom 48 and structured to be allowed to communicate with the joining cylinder 50. An annular burner joining portion 53 is formed integrally with the dish 16 to project over the inner surface of the bottom 48, the burner joining portion 53 being provided for the inner surface of the bottom 48 such that the burner joining portion 53 is made to be concentric with the gas hole 52. As shown in FIG. 4, a lower burner 54 and an upper burner 55 which constitute the burner mechanism 28 are joined to the burner joining portion 53. Since the burner mechanism 28 is constituted by the lower burner 54 and the upper burner 55, the bottom of an object which must be heated and which has been placed on the dish 16 can concentrically be heated. Thus, the combustion efficiency can be improved.

As indicated with a chain line shown in FIG. 2, the spark plug 56 allowed to pass through the bottom 48a is disposed adjacent to the burner joining portion 53 of the dish 16. The spark plug 56 is electrically connected to the piezoelectric spark unit 19 through a cord 57. When the piezoelectric spark unit 19 has been operated, the spark plug 56 sparks to burn the fuel gas discharged from the burner mechanism 28.

Figure 9:
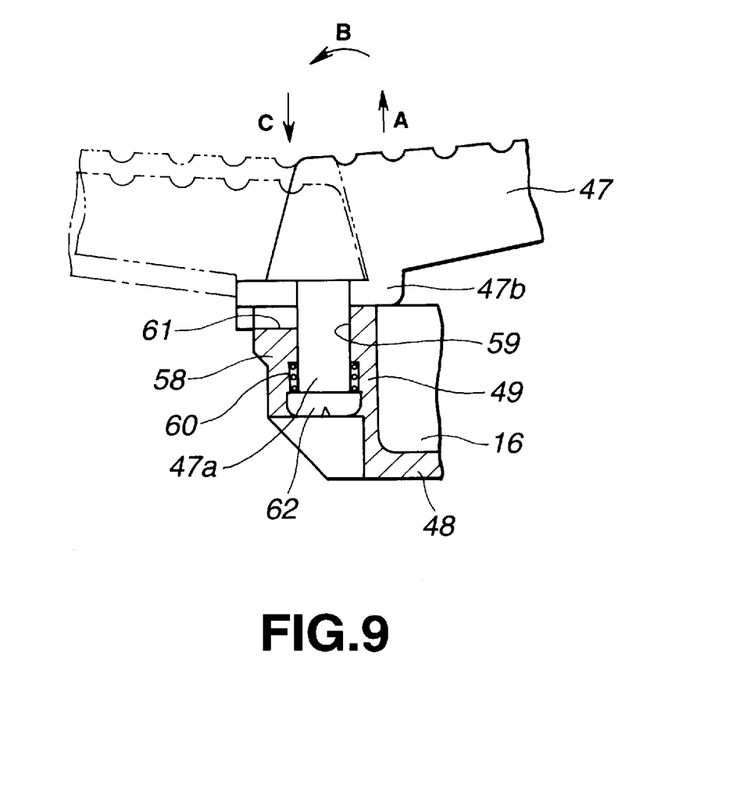
FIG. 9 is a diagram showing a support structure of a grate provided for the dish which constitutes a combustion portion of the gas cooking stove.

The dish 16 has the outer wall 49 provided with three grate joining portions 58 formed integrally with the outer wall 49. Each grate joining portion 58 is a portion for rotatively supporting the grate 47. As shown in FIG. 9, each grate joining portion 58 has a cylindrical shape having a joining hole 59 formed in the vertical direction. A coil spring 60 is joined to the position adjacent to the bottom of the joining hole 59 of each grate joining portion 58. A plurality of slit-shape engaging recesses 61 for locating the grate 47 are formed in the outer wall 49 for constituting each grate joining portion 58 of the dish 16.

The grate 47 is rotatively joined to the grate joining portions 58 of the dish 16 structured as described above. As shown in FIG. 2, each grate 47 is formed into a rectangular shape having a somewhat large thickness. A support shaft 47a is integrally formed with the bottom of an end of each grate 47. The outer diameter of the support shaft 47a of each grate 47 is substantially the same as the inner diameter of the joining hole 59 of the grate joining portion 58. Moreover, a vertical thread hole opened in the surface of the bottom is provided for each grate 47. Each grate 47 is joined to the grate joining portion 58 in a cantilever manner by a fixing screw 62 which engages the support shaft 47a to the joining hole 59 and screwed in the thread hole through the joining hole 59. An engaging recess 47b corresponding to an engaging recesses 61 of the grate joining portion 58 is integrally formed with the bottom of the base portion of each grate 47.

When the gas cooking stove 10 is not operated, each grate 47 is accommodated in a plane of projection of the dish 16, as indicated with a solid line shown in FIG. 9. Therefore, the size of the gas cooking stove 10 can furthermore be reduced, causing the portability to be improved.

When the gas cooking stove 10 is used, each grate 47 accommodated in the inside portion of the dish 16 as indicated with the solid line shown in FIG. 9 is moved upwards as indicated with an arrow A shown in FIG. 9. Thus, the support shaft 47a of each grate 47 is moved upwards in the grate joining portion 58 so that the urging force is provided for the coil spring 60. Each grate 47 is rotated to the outside portion of the dish 16 such that the support shaft 47a serves as the fulcrum, as indicated with an arrow B shown in FIG. 9.

When each grate 47 has been rotated to the outside portion of the dish 16 as indicated with an alternate long and two short dashes line, the engaging recess 47b is brought to a position corresponding to the engaging recesses 61 of the grate joining portion 58. As indicated with an alternate long and short dash line, the elastic force of the coil spring 60 causes each grate 47 to be brought to a state in which each grate 47 is allowed to project over the outer wall 49 of the dish 16 because the engaging recess 47b is engaged to the engaging recesses 61 and moved downwards as indicated with an arrow C. Therefore, a large and heavy object which must be heated can be placed on the dish 16 through each grate 47 of the gas cooking stove 10.

As described above, the grate joining portion 58 of each grate 47 is first moved in an upward direction and thus each grate 47 is rotated when the gas cooking stove 10 is operated. The engaging recess 47b of each grate 47 is reliably be engaged to the engaging recesses 61 owing to the elastic force of the contracted coil spring 60.

The dish 16 is formed into the circular shape. As a matter of course, the present invention is not limited to the foregoing shape. The dish 16 may be formed into an arbitrary shape, for example, a rectangular or a polygonal shape. When the dish 16 has, for example, the rectangular shape, the grate joining portion 58 is formed in each corner of the outer wall 49 to rotatively join the grate 47. The coil spring 60 is joined to the grate joining portion 58 to easily engage the engaging recess 47b of the grate 47 and the engaging recesses 61 to each other. Note that no problem arises from a viewpoint of practical use if the coil spring 60 is omitted.

The gas cooking stove 10 structured as described above is, as shown in FIG. 5, operated such that the valve-joining cylindrical portion 4 of the gas cylinder 1 is engaged to the stem engaging recess 23 so that the gas cylinder 1 is joined to the plug 14. The gas cooking stove 10 is arranged such that distance between the legs 35b and 35c of the cylinder holding member 35 allowed to face the inside portion of the guide hole 38 is elongated so that the valve-joining cylindrical portion 4 of the gas cylinder 1 is allowed to pass through the guide hole 38 of the cylinder holding member 15.

As shown in FIG. 4, the gas cooking stove 10 holds the gas cylinder 1 when the diameter of the cylinder holding member 35 is reduced so as to be engaged to the crimping recess 7 in the state in which the valve-joining cylindrical portion 4 has been engaged to the stem engaging recess 23. In the foregoing state of the gas cooking stove 10, the stem 5 of the gas cylinder 1 is pressed and inwards pushed by the surface of the ceiling of the stem engaging recess 23. The gas cooking stove 10 is arranged such that the outer surface of the stem 5 of the gas cylinder 1 is sealed by the first "O" ring 31. Moreover, the outer surface of the valve-joining cylindrical portion 4 is sealed by the second "O" ring 33. The gas cooking stove 10 is arranged such that the operation of inwards pushing the stem 5 causes the valve mechanism 6 of the gas cylinder 1 to be opened. Thus, the fuel gas is injected from the stem 5. The injected fuel gas is supplied to the gas cooking stove 10 such that the fuel gas is supplied to the small-diameter portion 21 of the valve opening 21 through the second gas passage 25.

The operation dial 18 of the gas cooking stove 10 is rotated counterclockwise in FIG. 2 so that the spindle shaft 26 is, in the axial direction, moved to the right in FIG. 4 in the valve opening 21. Thus, the nozzle opening 21b closed by the valve 26a is opened. In the gas cooking stove 10, the fuel gas is introduced into the second gas passage 25 through the small-diameter portion 21c and the nozzle opening 21b so as to be supplied to the piezoelectric spark unit 19.

The fuel gas is allowed to pass through the passage constituted by the second gas passage 25, the first gas passage 24, the mesh filter 29 and the nozzle 30 so as to be injected and supplied to the inside portion of the gas hole 52 of the dish 16 through the nozzle hole 30a. The fuel gas is, in the gas hole 52, mixed with air introduced through the air inlet opening 50a provided for the joining cylinder 50 so as to be supplied to the lower burner 54 and the upper burner 55.

The operating portion 19a of the piezoelectric spark unit 19 of the gas cooking stove 10 is depressed so that the operating member is operated. Thus, the spark plug 56 sparks so that the fuel gas discharged from the outer surface 37 is burnt. The lower burner 54 and the upper burner 55 of the gas cooking stove 10 concentrically heat the bottom of an object which must be heated and which has been placed on the grate 47. Thus, the gas cooking stove 10 is able to quickly heat the object which must be heated with the fuel gas having a large heating value. Since the gas cooking stove 10 is able to heat the object which must be heated in a short time, the taste of the dishes, such as potboiled dishes can sufficiently be derived.

The operation of the gas cooking stove 10 can significantly easily be performed because the gas cylinder 1 can be joined by the one-touch operation that the valve-joining cylindrical portion 4 is inwards pushed into the stem engaging recess 23. The gas cooking stove 10 skillfully employs the cylinder holding member 35 made of the wire having the converging characteristic and the diameter-enlarging characteristic and the crimping recess 7 provided for the valve-joining cylindrical portion 4 to maintain the joined gas cylinder 1. Thus, the structure can be simplified and the cost can be reduced.

After the operation of the gas cooking stove 10 has been completed, the gas cylinder 1 is drawn from the stem engaging recess 23. As a result of the operation for drawing the gas cylinder 1, the valve-joining cylindrical portion 4 enlarges the diameter of the cylinder holding member 35 engaged to the crimping recess 7. Thus, the valve-joining cylindrical portion 4 of the gas cylinder 1 is drawn from the stem engaging recess 23 so that the gas cylinder 1 is removed from the gas cooking stove 10 in the one-touch manner. When the gas cylinder 1 is twisted during the drawing operation, the gas cylinder 1 can be removed with small force.

When the operation dial 18 of the gas cooking stove 10 is rotated clockwise in FIG. 2, the spindle shaft 26 is moved to the left in FIG. 4 in the valve opening 21 in the axial direction. The gas cooking stove 10 is arranged such that the valve 26a of the spindle shaft 26 is engaged to the nozzle opening 21b of the valve opening 21 so that the valve mechanism 17 is closed. The gas cooking stove 10 is arranged such that either of the operation for removing the gas cylinder 1 or the operation for rotating the operation dial 18 may be performed first. It is preferable that the operation dial 18 is operated to first close the valve mechanism 17.

When the gas cooking stove 10 is used, the above-mentioned sequential operations of the grate 47 in the state shown in FIG. 3 are performed. Thus, as indicated with the alternate long and two short dashes line shown in FIGS. 2 and 9, the grate 47 is enlarged over the dish 16. The installing legs 20 of the gas cooking stove 10 in the state shown in FIG. 3 are rotated so as to be extended over the cylinder holding member 15, as shown in FIG. 2. The gas cooking stove 10 is put standby when an object which must be heated is placed on the grate 47. The gas cooking stove 10 heats the object which must be heated by burning the fuel gas by performing the operation for rotating the operation dial 18 and the operation of the piezoelectric spark unit 19. The gas cooking stove 10 heats the object which must be heated with strong heat in a short time so that the object is heated without deterioration of the taste of the dishes.

After the operation of the gas cooking stove 10 has been completed, the operation for rotating the operation dial 18 clockwise in FIG. 2 to extinguish the fire. In a state in which the elements, such as the dish 16, of the gas cooking stove 10 have sufficiently be cooled, the operation is performed to accommodate the grate 47, which has been extended, into the dish 16.

The extended installing legs 20 of the gas cooking stove 10 is rotated counterclockwise in FIG. 2 so as to be accommodated along the plug 14 shown in FIG. 3. The valve-joining cylindrical portion 4 is drawn from the stem engaging recess 23 so that the gas cylinder 1 joined to the gas-cylinder joining portion 13 of the gas cooking stove 10 is removed.

Since the gas cylinder 1 is attached/detached to and from the gas-cylinder joining portion 13 of the gas-cylinder joining portion 13 in the one-touch manner, the operability of the gas cooking stove 10 can be improved. The gas cooking stove 10 is arranged to restore the valve mechanism 6 after the gas cooking stove 10 has been used without an operation for forming a hole in the body 2 of the cylinder 1 and an operation for dropping the plug into the inside portion. Thus, the gas cylinder 1 can again be used. The gas cooking stove 10 is arranged such that the grate 47 is accommodated in the dish 16 and the installing legs 20 are accommodated along the plug 14. Thus, the overall size of the gas cooking stove 10 can be reduced when the gas cooking stove 10 is handled. Therefore, the portability can be improved. The operation for cleaning the grate 47 can easily be performed as compared with an apparatus arranged to use solid fuel. Moreover, attachment/detachment of the gas cylinder 1 can easily be performed. Therefore, the gas cooking stove 10 can significantly easily be handled. As a result, the gas cooking stove 10 can considerably easily and simply be handled when a multiplicity of the gas cooking stoves 10 are used, for example, at a party.

When the gas cylinder 1 is overheated during use of the gas cooking stove 10 and thus the internal pressure of the gas cylinder 1 has been raised to a level higher than, for example, 9 kg·f/cm$^2$, the gas cooking stove 10 is structured such that the valve-joining cylindrical portion 4 is, against the elastic force of the cylinder holding member 15, naturally removed from the stem engaging recess 23. That is, the excessively high internal pressure of the gas cylinder 1 exerts a high pressure on the valve-joining cylindrical portion 4 in a direction in which the valve-joining cylindrical portion 4 is drawn. When the foregoing pressure is raised to a level higher than the elastic holding force of the cylinder holding member 15, the natural removal occurs. Therefore, the gas cooking stove 10 has a function similar to the governor mechanism provided for a large-size gas cooking stove, the function being a function of detecting an abnormal pressure of the gas cylinder to interrupt supply of the gas. Therefore, the safety of the gas cooking stove 10 can be improved.

As described above, the gas cooking stove according to the present invention is structured such that the one-touch operation is performed. That is, the valve-joining cylindrical portion is engaged to the engaging recess formed in the gas-cylinder joining portion of the body of the gas cooking stove. Thus, the valve-joining cylindrical portion is held by the cylinder holding mechanism so that the gas cylinder is directly joined to the gas cooking stove. Therefore, the structure of the gas cooking stove for holding the gas cylinder can considerably be simplified. As a result, the number of required elements and the number of assembling steps can be reduced, causing the cost to be reduced. Since the gas cylinder can be attached/detached to and from the gas cooking stove with a simple operation, the operability can be improved. Since the size of the gas cooking stove can be reduced owing to its simple structure, the portability can be improved.

The gas cooking stove is structured such that the installing legs are rotatively supported by the body of the gas cooking stove. When the gas cooking stove is operated, the installing legs are rotated to extend the installing legs over the body of the gas cooking stove. When the gas cooking stove is not used, the installing legs are accommodated along the body of the gas cooking stove. Therefore, a large space for installing the gas cooking stove can be maintained, causing the gas cooking stove to be installed more stably. As a result, the operability and the safety can be improved. Since the installing legs are accommodated into a compact form when the gas cooking stove is not used, the overall size can be reduced. Hence it follows that the portability can be improved.

The gas cooking stove is structured such that the grate is rotatively supported with respect to the dish. When the gas cooking stove is used, the grate is rotated so as to outwards be extended over the dish. When the gas cooking stove is not used, the grate is accommodated in a plane of projection of the dish. Therefore, the gas cooking stove enables an object which must be heated and which has a relatively large size to stably be placed on the grate. Thus, the operability and the safety can be improved. When the gas cooking stove is not used, the grate is accommodated in a compact form. Therefore, the overall size can be reduced and the portability can be improved.

Since the gas cooking stove has a small size, light weight and excellent portability, the gas cooking stove can easily be used outdoors. The gas cooking stove uses a very-small gas cylinder and exhibits satisfactorily small size and excellent safety. Moreover, relatively strong heat can be obtained. Hence it follows that the gas cooking stove can easily be used as a second gas cooking stove for a general households. Moreover, the gas cooking stove can be used in inns, hotels and restaurants as a satisfactory gas cooking stove which is capable of serving dishes, such as hot-pot or meat dishes using the characteristics of the food.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A gas cooking stove employing a gas cylinder having a body portion for enclosing a liquefied gas therein, a valve mounting tubular portion extending at an upper end of the body portion and a valve mechanism provided with a stem thrust inwards for opening a gas flow duct, said gas cylinder enclosing the valve mechanism in said valve mounting tubular portion, said gas cylinder being caulked by a caulking recess obtained on reducing the diameter of said valve mounting tubular portion; said gas cooking stove comprising:

- a burner bowl formed in the shape of a saucer generally wherein an outer peripheral portion is mounted upright as one with an outer rim of a bottom surface, said burner bowl formed integrally from a mounting tubular portion being provided centrally of the bottom surface and having an internal gas duct, a burner mounting portion provided at an upper end opening of the mounting tubular portion, and a plurality of grate legs supporting portions provided at the outer peripheral portion;
- a burner plate mounted on said burner mounting portion of said burner bowl;
- a plurality of grate legs whose proximal end rotatably supported in a cantilever fashion by each grate leg supporting portion of said burner bowl, said grate legs being rotationally operated in use so that distal ends thereof are protruded outwards from the outer rim of said burner bowl, said grate legs being rotationally operated in non-use into a state so as to be housed in a space of the burner bowl;
- a tool plug member having a tubular mounting portion for securing the mounting tubular portion of the burner bowl formed protuberantly as one with an upper surface, a fitting recess formed in said bottom surface for receiving the valve mounting tubular portion of the gas cylinder, an annular cylinder holding member mounting portion provided on an inner rim of an opening passed through by said valve mounting tube of the gas cylinder of the fitting recess, a valve mechanism mounting through-hole provided in a lateral surface, a first gas flow duct having an upper end opened in the mounting portion and having a lower end opened in a valve mechanism mounting hole, and an internal second gas flow duct having the upper end opened in the valve mechanism mounting hole and the lower end opened in the fitting recess;
- a cylinder holding member formed substantially in a U shape from an elastic material wherein at least one portion of the inner rim of the elastic material is protruded into the opening of said fitting recess so as to be assembled in the cylinder holding member assembling portion of the tool plug member, said cylinder holding member constituting a cylinder holder mechanism for holding the gas cylinder by being interengaged as the cylinder holding member is elastically deformed in the caulking recess of the valve mounting tubular portion of the gas cylinder fitted by being thrust in the fitting recess through the opening; and
- a valve mechanism having spindle shaft mounted for recirocably mounted in the valve mechanism mounting hole in said tool plug member for opening or closing between the first gas flow duct and the second gas flow duct and an operating member for moving the spindle shaft between a first position of opening the spindle shaft between the first and second gas ducts and a second position of closing the spindle shaft between the first and second gas ducts.

* * * * *